US012203383B2

(12) United States Patent
Yamashita et al.

(10) Patent No.: US 12,203,383 B2
(45) Date of Patent: Jan. 21, 2025

(54) STEAM TURBINE

(71) Applicant: MITSUBISHI HEAVY INDUSTRIES, LTD., Tokyo (JP)

(72) Inventors: Shoki Yamashita, Tokyo (JP); Takakazu Yoshifuji, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/702,574

(22) PCT Filed: Nov. 30, 2022

(86) PCT No.: PCT/JP2022/044097
§ 371 (c)(1),
(2) Date: Apr. 18, 2024

(87) PCT Pub. No.: WO2023/112669
PCT Pub. Date: Jun. 22, 2023

(65) Prior Publication Data

US 2024/0418104 A1 Dec. 19, 2024

(30) Foreign Application Priority Data

Dec. 15, 2021 (JP) ................................ 2021-203224

(51) Int. Cl.
*F01D 25/26* (2006.01)
*F01D 11/08* (2006.01)

(52) U.S. Cl.
CPC .............. *F01D 25/26* (2013.01); *F01D 11/08* (2013.01); *F05D 2220/31* (2013.01); (Continued)

(58) Field of Classification Search
CPC .... F01D 25/26; F01D 25/246; F05D 2240/14; F05D 2240/55; F05D 2230/31; F01K 7/32
See application file for complete search history.

(56) References Cited

U.S. PATENT DOCUMENTS 4,362,464 A * 12/1982 Stock ...................... F01D 25/26 415/220
4,550,569 A * 11/1985 Isa .......................... F01D 25/26 60/647

(Continued)

FOREIGN PATENT DOCUMENTS

EP 2196628 6/2010
JP 57-70903 5/1982

(Continued)

OTHER PUBLICATIONS

International Search Report issued Feb. 21, 2023 in International Application No. PCT/JP2022/044097, with English translation of search report.

(Continued)

*Primary Examiner* — Eldon T Brockman
(74) *Attorney, Agent, or Firm* — Wenderoth, Lind & Ponack, L.L.P.

(57) ABSTRACT

A steam turbine according to at least one embodiment of the present disclosure includes an outer casing. The steam turbine according to at least one embodiment of the present disclosure includes an annular member, which is a single member provided radially inward of the outer casing, and formed in the annular member are a seal region in which a sealing device for sealing a gap between said member and the outer peripheral surface of a rotor is located, a rear-stage-stator-vane-holding region where a rear-stage stator vane is held, and an inner casing region connecting the seal region and the rear-stage-stator-vane-holding region. The steam turbine according to at least one embodiment of the present disclosure includes a front-stage vane ring that is attached to the annular member and that holds a front-stage stator vane.

13 Claims, 5 Drawing Sheets

(52) U.S. Cl.
CPC ...... *F05D 2240/12* (2013.01); *F05D 2240/14* (2013.01); *F05D 2240/55* (2013.01)

(56) References Cited

U.S. PATENT DOCUMENTS

| | | | | |
|---|---|---|---|---|
| 11,359,520 | B2 * | 6/2022 | Waki | F01K 23/10 |
| 2021/0254510 | A1 * | 8/2021 | Waki | F01K 23/10 |

FOREIGN PATENT DOCUMENTS

| | | | | |
|---|---|---|---|---|
| JP | 58-185903 | | | 10/1983 |
| JP | 59-229003 | | | 12/1984 |
| JP | 62-267506 | | | 11/1987 |
| JP | 2008202419 | A | * | 9/2008 |
| JP | 2019-218878 | | | 12/2019 |

OTHER PUBLICATIONS

International Preliminary Report on Patentability issued Jun. 27, 2024 in International Application No. PCT/JP2022/044097, with English translation.

* cited by examiner

II-II

STEAM TURBINE

TECHNICAL FIELD

The present disclosure relates to a steam turbine.

The present application claims the right of priority based on Japanese Patent Application No. 2021-203224 filed with the Japan Patent Office on Dec. 15, 2021, the content of which is incorporated herein by reference.

BACKGROUND ART

As a steam turbine of the related art, in addition to a steam turbine in which an inner casing, a vane ring, and a dummy ring are separate parts, a steam turbine in which a portion corresponding to an inner casing, a portion corresponding to a vane ring, and a portion corresponding to a dummy ring are formed in a single member is known (refer to, for example, PTL 1).

CITATION LIST

Patent Literature

[PTL 1] Japanese Unexamined Patent Application Publication No. S58-185903

SUMMARY OF INVENTION

Technical Problem

For example, as in the steam turbine described in the patent literature described above, when all stator vanes are held by a single member, it takes a long time to perform vane planting work of mounting the stator vanes on the member.

In view of the above-mentioned circumstances, at least one embodiment of the present disclosure has an object to provide a steam turbine in which it is possible to shorten a time required for vane planting work.

Solution to Problem (1) A steam turbine according to at least one embodiment of the present disclosure includes:

an outer casing;

an annular member which is a single member provided on a radial inner side of the outer casing, and which is formed with a seal region in which a sealing device for sealing a gap between the member and an outer peripheral surface of a rotor is disposed, a rear-stage stator vane holding region that holds a rear-stage stator vane, and an inner casing region that connects the seal region and the rear-stage stator vane holding region; and a front-stage vane ring that is mounted on the annular member and that holds a front-stage stator vane.

Advantageous Effects of Invention

According to at least one embodiment of the present disclosure, it is possible to shorten a time required for vane planting work in a steam turbine.

DESCRIPTION OF EMBODIMENTS

Figure 1:
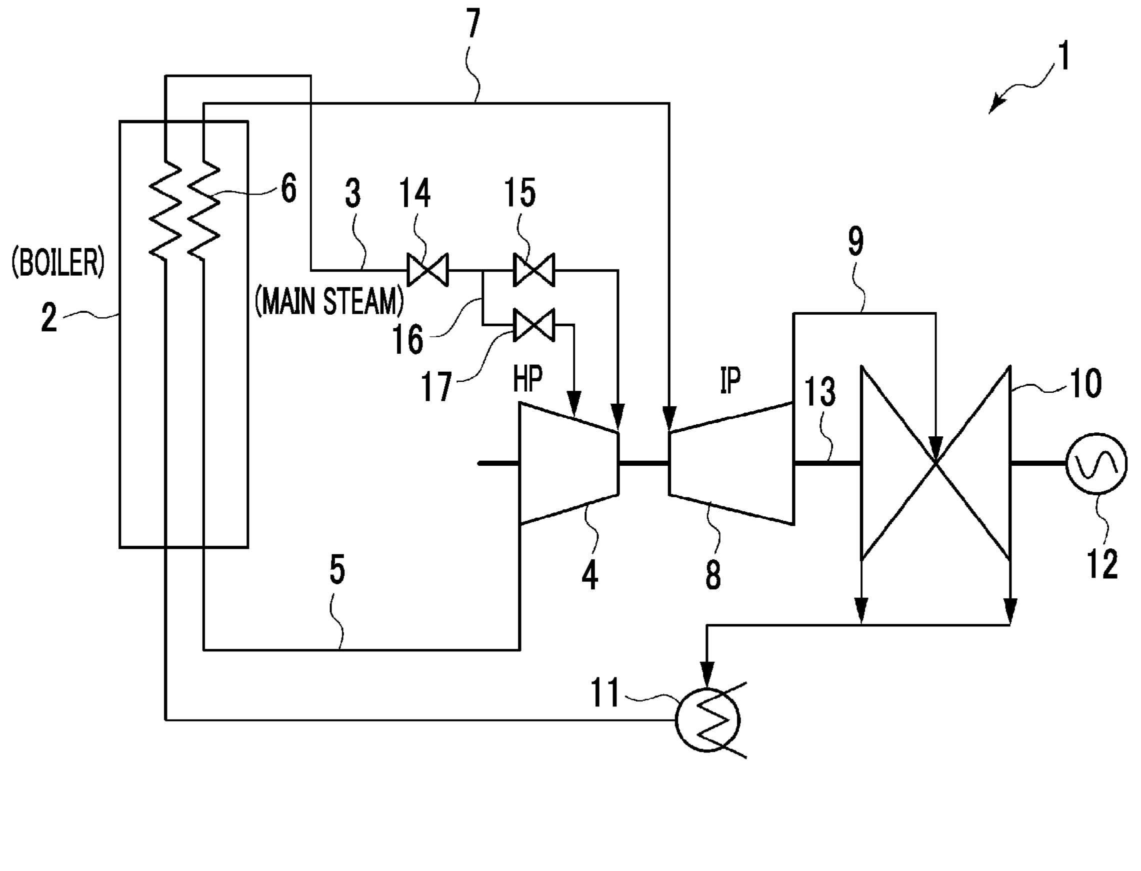
FIG. 1 is a schematic system diagram of steam turbine equipment that includes a steam turbine according to one embodiment.

Hereinafter, some embodiments of the present disclosure will be described with reference to the accompanying drawings. Dimensions, materials, shapes, relative arrangements, and the like of components described as embodiments or illustrated in the drawings are not intended to limit the scope of the present disclosure, but are merely explanatory examples.

For example, an expression indicating a relative disposition or an absolute disposition, such as “in a direction”, “along a direction”, “parallel”, “orthogonal”, “center”, “concentric”, or “coaxial”, not only strictly represents such a disposition, but also represents a state of being relatively displaced with a tolerance, or an angle or a distance to the extent that the same function can be obtained.

For example, expressions such as “identical”, “equal”, and “homogeneous”, which indicate that things are in the same state, not only represent a state of being strictly equal, but also represent a state in which there is a tolerance, or a difference to the extent that the same function can be obtained.

For example, an expression indicating a shape such as a square shape or a cylindrical shape not only represents a shape such as a square shape or a cylindrical shape in a geometrically strict sense, but also represents a shape that includes concave and convex portions, chamfered portions, or the like to the extent that the same effects can be obtained.

Meanwhile, an expression such as “comprising”, “possessing”, “provided with”, “including”, or “having” one component is not an exclusive expression excluding the presence of other components.

FIG. 1 is a schematic system diagram of steam turbine equipment that includes a steam turbine according to one embodiment. Steam turbine equipment 1 includes, as main equipment, a boiler 2, a high-pressure turbine 4, a medium-pressure turbine 8, a low-pressure turbine 10, a condenser 11, and a generator 12. The high-pressure turbine 4, the medium-pressure turbine 8, and the low-pressure turbine 10 are connected by a rotor 13, and the rotor 13 is connected to the generator 12.

Main steam generated in the boiler 2 flows down through a main steam pipe 3 and is led to an inlet of the high-pressure turbine 4. Exhaust steam discharged by driving the high-pressure turbine 4 flows down through a low-temperature reheat pipe 5 from the high-pressure turbine 4, is led to a reheater 6 of the boiler 2, and is reheated. The steam heated in the reheater 6 flows down through a high-temperature reheat pipe 7, is led to the medium-pressure turbine 8, drives the medium-pressure turbine 8, and then flows down through a main steam pipe 9 to be led to the low-pressure turbine 10. The exhaust steam discharged by driving the low-pressure turbine 10 is introduced into the condenser 11, cooled to be converted into water, and then reintroduced into the boiler 2 as feed water. As described above, the high-pressure turbine 4, the medium-pressure turbine 8, and the low-pressure turbine 10 are connected by the rotor 13, rotational power is transmitted to the generator 12 through the rotor 13, and the rotational power is converted into electric power by the generator 12.

The main steam pipe 3 through which the main steam flows from the boiler 2 to the high-pressure turbine 4 is provided with a main steam stop valve 14 and a main steam adjusting valve 15 from an upstream side toward a downstream side in a steam flow direction. Further, a bypass pipe 16 is provided to branch from the main steam pipe 3 between the main steam stop valve 14 and the main steam adjusting valve 15. The bypass pipe 16 branched from the main steam pipe 3 is connected to an intermediate stage of the high-pressure turbine 4, and a portion of the main steam flowing through the main steam pipe 3 bypasses a part of an upstream side stage of the high-pressure turbine 4 and is introduced into the high-pressure turbine 4 from the intermediate stage. The bypass pipe 16 is provided with an overload valve 17 to control an amount of bypass steam flowing through the bypass pipe 16.

Figure 2:
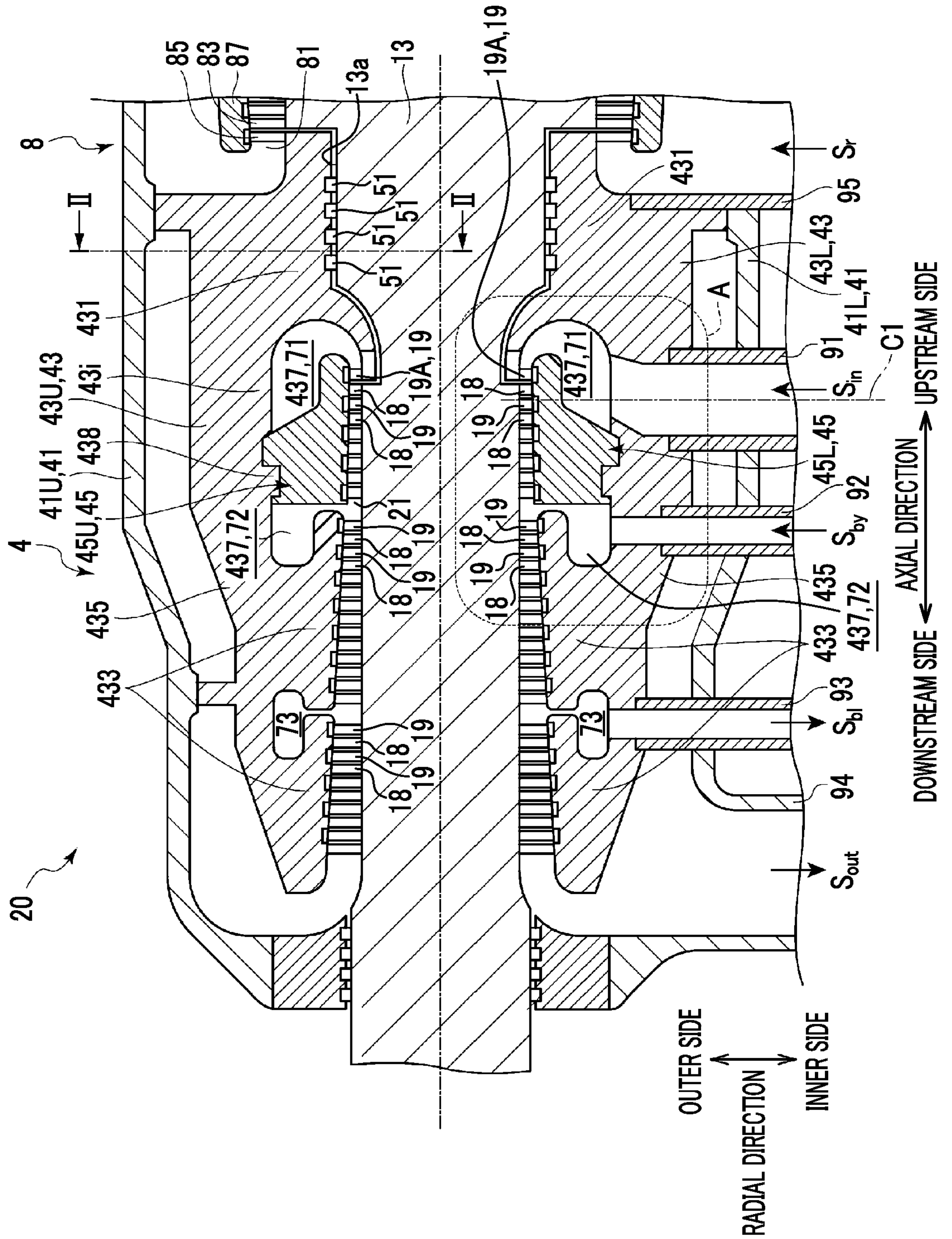
FIG. 2 is a sectional view schematically showing a structure of a steam turbine according to one embodiment of the present disclosure.

FIG. 2 is a sectional view schematically showing a structure of a steam turbine 20 according to one embodiment of the present disclosure.

The steam turbine 20 according to one embodiment is a medium-high pressure integrated type steam turbine in which the high-pressure turbine 4 and the medium-pressure turbine 8 are integrally configured. In FIG. 2, there is mainly shown a structure of the high-pressure turbine 4 out of the high-pressure turbine 4 and the medium-pressure turbine 8 that are integrally configured.

The high-pressure turbine 4 shown in FIG. 2 includes an outer casing 41, an annular member 43, and a front-stage vane ring 45.

In the high-pressure turbine 4 shown in FIG. 2, the outer casing 41 is divided, in a horizontal plane, into an outer casing upper half portion 41U and an outer casing lower half portion 41L. In the following description, in a case where it is not necessary to distinguish the outer casing upper half portion 41U and the outer casing lower half portion 41L from each other, the outer casing upper half portion 41U and the outer casing lower half portion 41L are sometimes simply referred to as the outer casing 41.

In the high-pressure turbine 4 shown in FIG. 2, a plurality of turbine stages are provided in an axial direction on an inner periphery side of the outer casing 41, and a main steam flow path 21 through which the main steam flows is formed. The turbine stage includes a plurality of rotor blades 18 fixed in a circumferential direction of the rotor 13, and a stator vane 19 fixed to the annular member 43 or to the front-stage vane ring 45, which will be described in detail later, so as to face the upstream side of each of the rotor blades 18.

In the medium-pressure turbine 8 shown in FIG. 2, a plurality of turbine stages are provided in the axial direction on the inner periphery side of the outer casing 41, and a main steam flow path 81 through which the main steam flows is formed. The turbine stage includes a plurality of rotor blades 83 fixed in the circumferential direction of the rotor 13, and a stator vane 85 fixed to a vane ring 87 so as to face the upstream side of each of the rotor blades 83.

The steam turbine 20 according to one embodiment is provided with a plurality of pipe stands. The plurality of pipe stands include, for example, a first inlet pipe stand 91 for supplying main steam Sin from the main steam pipe 3 to the high-pressure turbine 4, a second inlet pipe stand 92 for supplying bypass steam Sby from the bypass pipe 16 to the high-pressure turbine 4, an air bleeding pipe stand 93 for discharging steam Sbl that is bled from the high-pressure turbine 4, an outlet pipe stand 94 for discharging exhaust steam Sout, which drives the high-pressure turbine 4 and is then discharged, to the low-temperature reheat pipe 5, a third inlet pipe stand 95 for supplying reheated steam Sr from the high-temperature reheat pipe 7 to the medium-pressure turbine 8, and the like.

(Annular Member 43)

In the high-pressure turbine 4 shown in FIG. 2, the annular member 43 is a single member provided on the radial inner side of the outer casing 41, and is formed with a seal region 431, a rear-stage stator vane holding region 433, and an inner casing region 435.

In the high-pressure turbine 4 shown in FIG. 2, the seal region 431 is provided between the high-pressure turbine 4 and the medium-pressure turbine 8 which are integrally provided. In the high-pressure turbine 4 shown in FIG. 2, the seal region 431 is a region in which a sealing device 51 for sealing a gap between an outer peripheral surface 13*a* of the rotor 13 and the annular member 43 is disposed. The sealing device 51 is, for example, a labyrinth seal having seal fins.

In the high-pressure turbine 4 shown in FIG. 2, the rear-stage stator vane holding region 433 is a region that holds the rear-stage stator vanes 19.

In the high-pressure turbine 4 shown in FIG. 2, the inner casing region 435 is a region that connects the seal region 431 and the rear-stage stator vane holding region 433.

In the high-pressure turbine 4 shown in FIG. 2, the annular member 43 corresponds to a single member in which a dummy ring, a vane ring, and an inner casing are formed in a steam turbine of the related art.

A recessed portion 437 is provided in an inner peripheral portion 431 of the annular member 43 between the seal region 431 and the rear-stage stator vane holding region 433. The front-stage vane ring 45, which will be described in detail below, is disposed in the recessed portion 437. The recessed portion 437 is separated by the front-stage vane ring 45 into a region on an axial upstream side and a region on an axial downstream side.

The region on the axial upstream side separated by the front-stage vane ring 45, of the recessed portion 437, forms a first cavity 71, which will be described later. The region on the axial downstream side separated by the front-stage vane ring 45, of the recessed portion 437, forms a second cavity 72, which will be described later.

Further, in the annular member 43, a third cavity 73 for air bleeding is formed on the axial downstream side with respect to the second cavity 72.

The first cavity 71 is connected to the first inlet pipe stand 91. The second cavity 72 is connected to the second inlet pipe stand 92. The third cavity 73 is connected to the air bleeding pipe stand 93.

In the high-pressure turbine 4 shown in FIG. 2, the annular member 43 is formed with a first contact portion 438 that restricts movement of the front-stage vane ring 45 toward the axial downstream side. The first contact portion 438 is formed on a surface on a radial outer side of an inner peripheral surface of the recessed portion 437.

In the high-pressure turbine 4 shown in FIG. 2, the annular member 43 is divided, in a horizontal plane, into an annular member upper half portion 43U and an annular member lower half portion 43L. The annular member upper half portion 43U and the annular member lower half portion 43L are joined together by a plurality of joining bolts that include a first joining bolt 76 and a second joining bolt 77 (refer to FIG. 3 to be described later).

In the following description, in a case where it is not necessary to distinguish the annular member upper half portion 43U and the annular member lower half portion 43L from each other, the annular member upper half portion 43U and the annular member lower half portion 43L are sometimes simply referred to as the annular member 43.

(Front-Stage Vane Ring 45)

Figure 4:
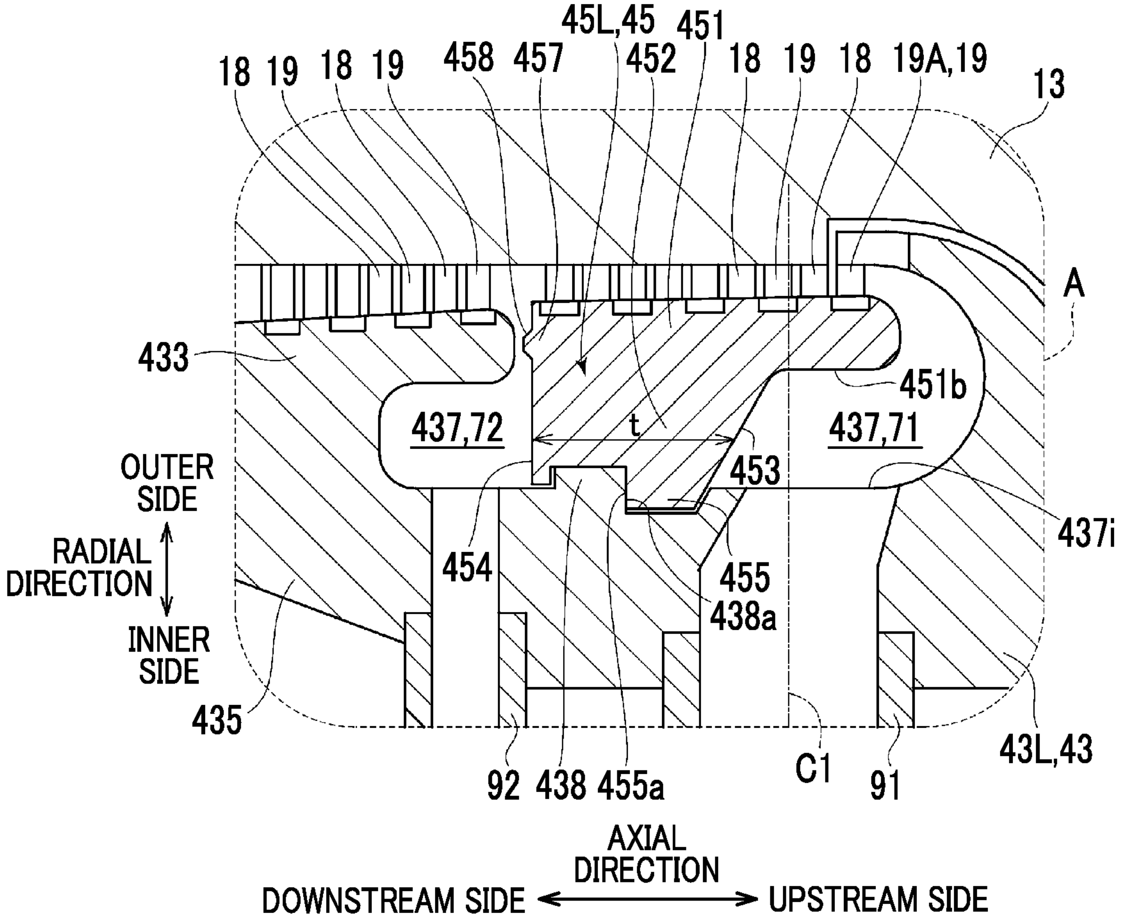
FIG. 4 is a sectional view schematically showing part A in FIG. 2.

FIG. 4 is a sectional view schematically showing part A in FIG. 2.

In the high-pressure turbine 4 shown in FIG. 2, as shown in FIG. 4, the front-stage vane ring 45 is a member different from the annular member 43, and is a vane ring that is mounted on the annular member 43 and that holds the front-stage stator vanes 19. The front-stage vane ring 45 includes an inner region 451 that extends in the axial direction and that holds the stator vanes 19, and an outer region 452 that protrudes radially outward from the inner region 451.

The inner region 451 holds a plurality of stages of stator vanes 19 including a first stator vane 19A which is the stator vane 19 in a most upstream stage.

A back surface 451*b* on the radial outer side of the inner region 451 is radially separated from an inner peripheral surface 437*i* of the recessed portion 437 of the annular member 43.

The outer region 452 is a portion between an inclined surface 453 that faces the axial upstream side toward the radial inner side and an end surface 454 on the axial downstream side of the front-stage vane ring 45.

In the high-pressure turbine 4 shown in FIG. 2, the inclined surface 453 linearly extends to face the axial upstream side toward the radial inner side, in a cross section along a radial direction and the axial direction.

In the high-pressure turbine 4 shown in FIG. 2, an axial wall thickness t (refer to FIG. 4) of the front-stage vane ring 45 increases toward the radial inner side between the inclined surface 453 and the end surface 454 on the axial downstream side in the outer region 452.

The front-stage vane ring 45 is formed with a second contact portion 455 that is a protrusion portion protruding radially outward from the outer region 452. A surface 455*a* on the axial downstream side of the second contact portion 455 comes into contact with a surface 438*a* on the axial upstream side of the first contact portion 438 of the annular member 43.

In the high-pressure turbine 4 shown in FIG. 2, the end surface 454 of the front-stage vane ring 45 extends in a direction orthogonal to the axial direction. The end surface 454 of the front-stage vane ring 45 may extend in a direction inclined with respect to the radial direction, or may have a curved shape in the cross section along the radial direction and the axial direction.

In the high-pressure turbine 4 shown in FIG. 2, the front-stage vane ring 45 is divided, in a horizontal plane, into a front-stage vane ring upper half portion 45U and a front-stage vane ring lower half portion 45L. In the following description, in a case where it is not necessary to distinguish the front-stage vane ring upper half portion 45U and the front-stage vane ring lower half portion 45L from each other, the front-stage vane ring upper half portion 45U and the front-stage vane ring lower half portion 45L are sometimes simply referred to as the front-stage vane ring 45.

(First Cavity 71)

In the high-pressure turbine 4 shown in FIG. 2, the first cavity 71 is a cavity to which the main steam Sin from the main steam pipe 3 is supplied.

The first cavity 71 is formed by a region on the axial upstream side separated from the front-stage vane ring 45, of the recessed portion 437, and the front-stage vane ring 45. Specifically, the first cavity 71 is defined by the inner peripheral surface of the region on the axial upstream side separated from the front-stage vane ring 45, of the recessed portion 437, the inclined surface 453 of the front-stage vane ring 45, and the back surface 451*b* of the inner region 451.

The main steam Sin supplied to the first cavity 71 flows from the first cavity 71 toward the first stator vane 19A, which is the stator vane 19 in the most upstream stage, and flows into the main steam flow path 21.

(Second Cavity 72)

In the high-pressure turbine 4 shown in FIG. 2, the second cavity 72 is a cavity to which the bypass steam Sby from the bypass pipe 16 is supplied.

The second cavity 72 is formed by a region on the axial downstream side separated from the front-stage vane ring 45, of the recessed portion 437, and the front-stage vane ring 45. Specifically, the second cavity 72 is defined by the inner peripheral surface of the region on the axial downstream side separated from the front-stage vane ring 45, of the recessed portion 437, and the end surface 454 on the axial downstream side of the front-stage vane ring 45.

The bypass steam Sby supplied to the second cavity 72 flows from the second cavity 72 toward the stator vane 19 in the most upstream stage, among the stator vanes 19 mounted on the rear-stage stator vane holding region 433, and flows into the main steam flow path 21.

(Third Cavity 73)

In the high-pressure turbine 4 shown in FIG. 2, the third cavity 73 is a cavity provided for air bleeding on the axial downstream side with respect to the second cavity 72.

The steam that has flowed into the third cavity 73 from the main steam flow path 21 is discharged to the outside of the high-pressure turbine 4 through the air bleeding pipe stand 93.

Figure 5:
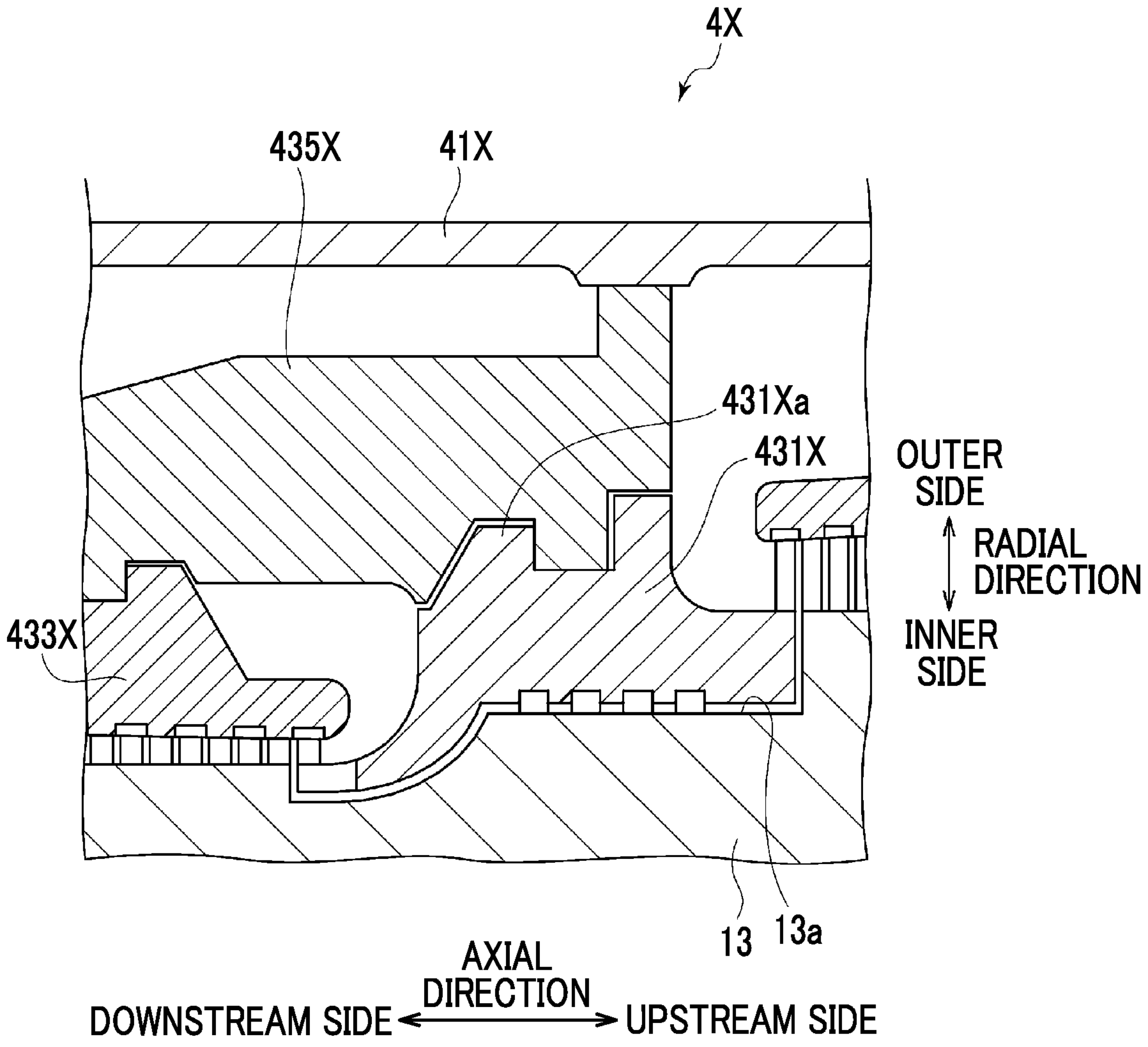
FIG. 5 is a sectional view schematically showing a structure of a part of a steam turbine of the related art.

FIG. 5 is a sectional view schematically showing a structure of a part of a steam turbine 4X of the related art, in which a dummy ring 431X, a vane ring 433X, and an inner casing 435X are separate members.

In the steam turbine 4X of the related art, due to the pressure of the main steam supplied to the steam turbine 4X, a relatively large thrust force to move the dummy ring 431X to the axial upstream side acts on the dummy ring 431X. Therefore, in order to ensure the strength of a fitting portion 431Xa that fits into the inner casing 435X in the dummy ring 431X, the size of the dummy ring 431X is made relatively large. As a result, the physical size of the turbine including the inner casing 435X and an outer casing 41X increases.

In the high-pressure turbine 4 shown in FIG. 2, as described above, the seal region 431, the rear-stage stator vane holding region 433, and the inner casing region 435 are formed in the annular member 43, which is a single member. Therefore, there is no fitting portion 431Xa of the dummy ring 431X in the steam turbine 4X of the related art, so that compared to the steam turbine 4X of the related art, the annular member 43 can be made smaller than the inner casing 435X in the steam turbine 4X of the related art. In this way, the high-pressure turbine 4 and the steam turbine 20 shown in FIG. 2 can be downsized. In other words, in the high-pressure turbine 4 shown in FIG. 2, it is possible to supply higher-pressure steam while maintaining the same physical size as the physical size of the outer casing of the steam turbine of the related art.

Further, in the high-pressure turbine 4 shown in FIG. 2, the number of the stator vanes 19 which are mounted on the rear-stage stator vane holding region 433 of the annular member 43 can be reduced by the number of the stator vanes 19 which are mounted on the front-stage vane ring 45.

Therefore, vane planting work of mounting the stator vanes 19 on the front-stage vane ring 45 and vane planting work of mounting the stator vanes 19 on the rear-stage stator vane holding region 433 of the annular member 43 can be performed in parallel. In this way, compared to a case where all the stator vanes 19 are mounted on the annular member 43, a time required for the vane planting work can be shortened.

Further, in the high-pressure turbine 4 shown in FIG. 2, the front-stage vane ring 45 which is mounted on the annular member 43 and holds the front-stage stator vanes 19 is provided, so that the first cavity 71 or the second cavity 72 can be formed between the annular member 43 and the front-stage vane ring 45.

For example, in a case where the annular member 43 is formed by casting, there is considered a case where the front-stage vane ring 45 is integrally cast as the same member without being made a separate member from the annular member 43. In this case, the first cavity 71 or the second cavity 72 becomes a relatively enclosed space such as a closed space, so that castability becomes poor, and, for example, a probability of casting defects occurring increases, so that it becomes difficult to ensure the reliability of a material.

According to the high-pressure turbine 4 shown in FIG. 2, since the portion of the annular member 43 where the front-stage vane ring 45 is disposed is open to be relatively large, castability is improved, and in addition, after casting, trimming such as finishing the surfaces defining the first cavity 71 or the second cavity 72 becomes easier.

In the high-pressure turbine 4 shown in FIG. 2, in order to secure the volume of the first cavity 71 to which the main steam from the main steam pipe 3 is supplied, the diameter of a radial outer wall surface forming the first cavity 71, that is, the surface facing radially inward in the recessed portion 437, has to be secured to a certain extent or more. Therefore, in the high-pressure turbine 4 shown in FIG. 2, even if the portion corresponding to the front-stage vane ring 45 is formed in the annular member 43 which is a single member, the outer diameter of the annular member 43 does not become small. Therefore, from the viewpoint of downsizing the annular member 43, there is almost no advantage in forming the portion corresponding to the front-stage vane ring 45 in the annular member 43 which is a single member.

On the contrary, in the high-pressure turbine 4 shown in FIG. 2, the front-stage vane ring 45 is made to be a separate member from the annular member 43, so that a time required for the vane planting work can be shortened as described above.

Figure 3:
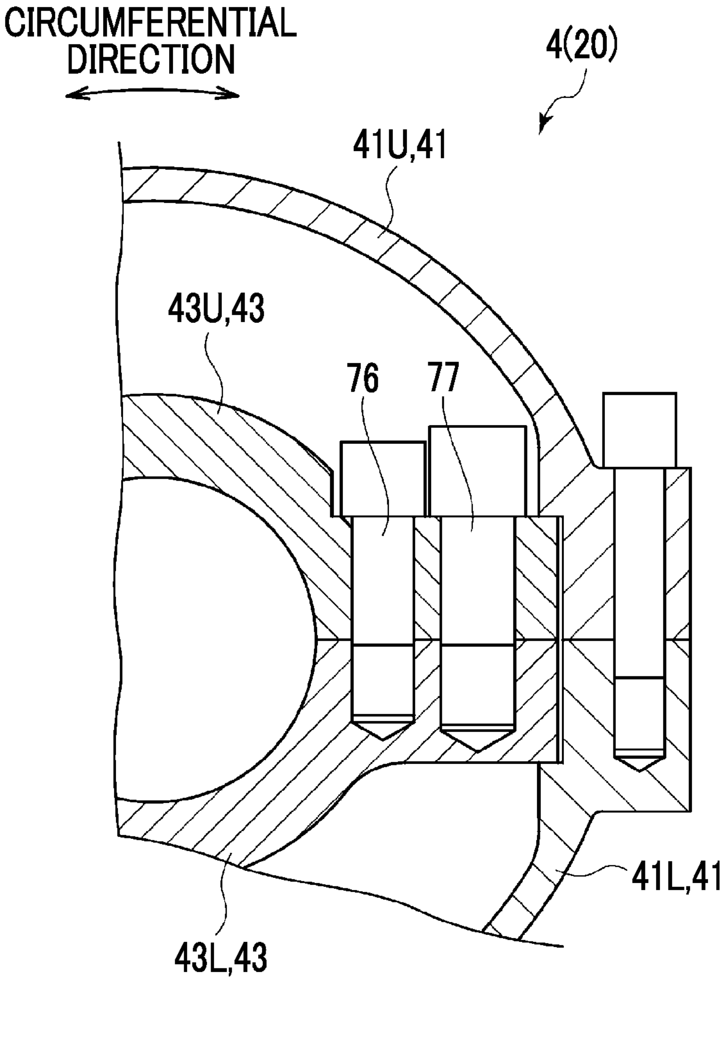
FIG. 3 is a diagram schematically showing a part of a cross section taken along line II-II in FIG. 2 and viewed in a direction of an arrow.

FIG. 3 is a diagram schematically showing a part of a cross section taken along line II-II in FIG. 2 and viewed in a direction of an arrow. In FIG. 3, illustration of the rotor 13 is omitted. As shown in FIG. 3, the high-pressure turbine 4 according to one embodiment includes the first joining bolt 76 which is a joining bolt that joins the annular member upper half portion 43U and the annular member lower half portion 43L, and which is disposed within a range in which the seal region 431 is formed along the axial direction. The high-pressure turbine 4 according to one embodiment includes the second joining bolt 77 which is disposed on the radial outer side with respect to the first joining bolt 76, and whose position in the axial direction overlaps with the first joining bolt 76. In the example shown in FIG. 3, the first joining bolt 76 and the second joining bolt 77 are disposed at the same axial position.

In the high-pressure turbine 4 according to one embodiment, as described above, compared to the steam turbine 4X of the related art, the annular member 43 can be made smaller than the inner casing 435X in the steam turbine 4X of the related art. In this way, the first joining bolt 76 and the second joining bolt 77 can be disposed side by side in the radial direction without increasing the size of the outer casing 41. Therefore, it is possible to increase the pressure of the supplied steam without increasing the size of the outer casing 41.

In the high-pressure turbine 4 according to one embodiment, as described above, the seal region 431 and the front-stage vane ring 45 form the first cavity 71 to which the main steam Sin is supplied, between the seal region 431 and the front-stage vane ring 45.

In this way, since it is not necessary to separately provide a chamber for steam supply, an increase in the physical size of the high-pressure turbine 4 (the steam turbine 20) can be suppressed.

In the high-pressure turbine 4 according to one embodiment, as described above, the front-stage vane ring 45 and the rear-stage stator vane holding region 433 form the second cavity 72 to which the bypass steam Sby from the bypass pipe 16 is supplied, between the front-stage vane ring 45 and the rear-stage stator vane holding region 433.

In this way, the bypass steam Sby that is supplied in order to obtain an output exceeding the rated output in the high-pressure turbine 4 can be supplied to the second cavity 72. In this way, an output exceeding the rated output can be obtained in the high-pressure turbine 4.

In the high-pressure turbine 4 according to one embodiment, as shown in FIG. 4, the front-stage vane ring 45 has a protrusion portion 458 that protrudes toward the axial downstream side at an end portion 457 that is located on the radial inner side with respect to the second cavity 72 and faces the rear-stage stator vane holding region 433.

The protrusion portion 458 is, for example, a protrusion extending along the circumferential direction.

In this way, the flow of the bypass steam Sby flowing from the second cavity 72 through the gap between the front-stage vane ring 45 and the rear-stage stator vane holding region 433 is restricted by the protrusion portion 458, so that it is possible to prevent a flow rate of the bypass steam Sby flowing toward the stator vanes 19 held by the rear-stage stator vane holding region 433 from becoming non-uniform in the circumferential direction.

As shown in FIGS. 2 and 4, in the high-pressure turbine 4 according to one embodiment, a central axis C1 of the first inlet pipe stand 91 for supplying the main steam Sin to the first stator vane 19A located on a most upstream side in the axial direction is located on the axial downstream side with respect to the first stator vane 19A.

In this way, for example, in a case where two steam turbines (the high-pressure turbine 4 and the medium-pressure turbine 8) are accommodated in one outer casing 41, as in the steam turbine 20 according to one embodiment, an axial distance between the pipe stand (the third inlet pipe stand 95) for supplying steam to the adjacent steam turbine (the medium-pressure turbine 8) and the first inlet pipe stand 91 for supplying the main steam Sin can be secured. In this way, an axial length of the steam turbine 20 can be suppressed.

As shown in FIGS. 2 and 4, in the high-pressure turbine 4 according to one embodiment, the inclined surface 453 of the front-stage vane ring 45 faces the first cavity 71 to which the main steam Sin is supplied. The inclined surface 453 is inclined with respect to the radial direction and the axial direction so as to face the axial upstream side toward the radial inner side.

In this way, the main steam Sin flowing into the first cavity 71 from the first inlet pipe stand 91 is guided by the inclined surface 453 and the back surface 451*b* connected to the inclined surface 453, and is guided toward the axial upstream side. In this way, a pressure loss within the first cavity 71 can be suppressed.

The main steam Sin guided toward the axial upstream side is guided by the wall surface of the recessed portion 437 of the annular member 43, flows toward the first stator vane 19A, and flows into the main steam flow path 21.

As shown in FIGS. 2 and 4, in the high-pressure turbine 4 according to one embodiment, the front-stage vane ring 45 may have the inclined surface 453 that faces the axial upstream side toward the radial inner side.

A thrust force to move the front-stage vane ring 45 toward the axial downstream side with respect to the annular member 43 acts on the front-stage vane ring 45 due to the pressure of the main steam Sin. Therefore, as described above, the annular member 43 is formed with the first contact portion 438 that restricts the movement of the front-stage vane ring 45 toward the axial downstream side. Further, the front-stage vane ring 45 is formed with the second contact portion 455 that comes into contact with the first contact portion 438.

Since during operation of the high-pressure turbine 4, the thrust force acts on the front-stage vane ring 45 due to the pressure of the main steam Sin that is supplied, the second contact portion 455 comes into contact with the first contact portion 438 and receives a reaction force. The reaction force generates stress in the front-stage vane ring 45.

In the high-pressure turbine 4 according to one embodiment, the high-pressure turbine 4 includes the inclined surface 453, so that an axial dimension of the front-stage vane ring 45 can be increased toward the radial inner side. In this way, the stress that is generated in the front-stage vane ring 45 can be reduced.

In the high-pressure turbine 4 according to one embodiment, the inclined surface 453 may linearly extend to face the axial upstream side toward the radial inner side, in the cross section along the radial direction and the axial direction shown in FIGS. 2 and 4.

In this way, compared to a case where the inclined surface 453 is a concave surface, the wall thickness of the front-stage vane ring 45 can be increased by the amount corresponding to the thickness when the inclined surface 453 is not a concave surface. In this way, the stress that is generated in the front-stage vane ring 45 can be reduced.

As shown in FIGS. 2 and 4, in the high-pressure turbine 4 according to one embodiment, the axial wall thickness t (refer to FIG. 4) of the front-stage vane ring 45 may increase toward the radial inner side between the end surface 454 on the axial downstream side of the front-stage vane ring 45 and the inclined surface 453.

In this way, the stress that is generated in the front-stage vane ring 45 can be reduced.

As shown in FIGS. 2 and 4, in the high-pressure turbine 4 according to one embodiment, the number of the stator vanes 19 that are held by the front-stage vane ring 45 may be smaller than the number of the stator vanes 19 that are held by the rear-stage stator vane holding region 433.

By suppressing the number of stages in the front-stage vane ring 45, it is possible to suppress a thrust force acting on the front-stage vane ring 45 due to the difference in steam pressure between the upstream side and the downstream side of the front-stage vane ring 45. In this way, the first contact portion 438 and the second contact portion 455, which are portions provided to restrict the movement of the front-stage vane ring 45 toward the axial downstream side, can be prevented from becoming large. Therefore, this contributes to downsizing of the high-pressure turbine 4 (the steam turbine 20).

As shown in FIG. 2, the steam turbine 20 according to one embodiment may be a medium-high pressure integrated type steam turbine 20 which includes a high-pressure section (the high-pressure turbine 4) and a medium-pressure section (the medium-pressure turbine 8). The high-pressure section (the high-pressure turbine 4) may include the annular member 43 and the front-stage vane ring 45 described above.

In this way, the medium-high pressure integrated type steam turbine 20 can be downsized. Further, according to the steam turbine 20 according to one embodiment, a time required for vane planting work can be shortened.

In the steam turbine 20 according to one embodiment, the main steam Sin that is supplied to the first cavity 71 may be supercritical pressure steam. That is, the high-pressure turbine 4 according to one embodiment may be a supercritical pressure steam turbine.

According to the steam turbine 20 according to one embodiment, since the outer casing 41, the annular member 43, and the front-stage vane ring 45 described above are provided, the supercritical pressure steam turbine can be downsized. Further, according to the steam turbine 20 according to one embodiment, a time required for vane planting work in the supercritical pressure steam turbine can be shortened.

The present disclosure is not limited to the embodiments described above, and includes modified forms of the embodiments described above or forms in which these forms are combined as appropriate.

The contents described in each of the embodiments described above are understood as follows, for example.

(1) The steam turbine 20 (the high-pressure turbine 4) according to at least one embodiment of the present disclosure includes the outer casing 41. The steam turbine 20 (the high-pressure turbine 4) according to at least one embodiment of the present disclosure includes the annular member 43 which is a single member provided on a radial inner side of the outer casing 41, and which is formed with the seal region 431 in which the sealing device 51 for sealing the gap between the member and the outer peripheral surface 13*a* of the rotor 13 is disposed, the rear-stage stator vane holding region 433 that holds the rear-stage stator vane 19, and the inner casing region 435 that connects the seal region 431 and the rear-stage stator vane holding region 433. The steam turbine 20 (the high-pressure turbine 4) according to at least one embodiment of the present disclosure includes the front-stage vane ring 45 that is mounted on the annular member 43 and that holds the front-stage stator vane 19.

According to the configuration of the above (1), the seal region 431, the rear-stage stator vane holding region 433, and the inner casing region 435 are formed in the annular member 43 which is a single member. Therefore, compared to the steam turbine 4X of the related art, the annular member 43 can be made smaller than the inner casing 435X in the steam turbine 4X of the related art. In this way, the steam turbine 20 (the high-pressure turbine 4) according to one embodiment can be downsized. In other words, according to the configuration of the above (1), it is possible to supply higher-pressure steam while maintaining the same physical size as the physical size of the outer casing 41X of the steam turbine 4X of the related art.

Further, according to the configuration of the above (1), the number of the stator vanes 19 which are mounted on the rear-stage stator vane holding region 433 of the annular member 43 can be reduced by the number of the stator vanes 19 which are mounted on the front-stage vane ring 45. Therefore, vane planting work of mounting the stator vanes 19 on the front-stage vane ring 45 and vane planting work of mounting the stator vanes 19 on the rear-stage stator vane holding region 433 of the annular member 43 can be performed in parallel. In this way, compared to a case where all the stator vanes 19 are mounted on the annular member 43, a time required for the vane planting work can be shortened.

(2) In some embodiments, in the configuration of the above (1), the annular member 43 may include an upper half portion (the annular member upper half portion 43U) and a lower half portion (the annular member lower half portion 43L) joined together in a horizontal plane. In some embodiments, a plurality of joining bolts (for example, the first joining bolt 76 and the overlapping second joining bolt 77) that join the upper half portion (the annular member upper half portion 43U) and the lower half portion (the annular member lower half portion 43L) may be provided. The plurality of joining bolts may include the first joining bolt 76 disposed within a range in which the seal region 431 is formed along the axial direction, and the second joining bolt 77 that is disposed on the radial outer side with respect to the first joining bolt 76 and whose position in the axial direction overlaps with the first joining bolt 76.

According to the configuration of the above (2), compared to the steam turbine 4X of the related art, the annular member 43 can be made smaller than the inner casing 435X in the steam turbine 4X of the related art. In this way, the first joining bolt 76 and the second joining bolt 77 can be disposed side by side in the radial direction without increasing the size of the outer casing 41. Therefore, it is possible to increase the pressure of the supplied steam without increasing the size of the outer casing 41.

(3) In some embodiments, in the configuration of the above (1) or (2), the seal region 431 and the front-stage vane ring 45 may form the first cavity 71 to which first steam (the main steam Sin) is supplied, between the seal region 431 and the front-stage vane ring 45.

According to the configuration of the above (3), since it is not necessary to separately provide a chamber for steam supply, an increase in the physical size of the steam turbine 20 (the high-pressure turbine 4) can be suppressed.

(4) In some embodiments, in the configuration of the above (3), the front-stage vane ring 45 and the rear-stage stator vane holding region 433 may form the second cavity 72 to which second steam (the bypass steam Sby) is supplied, between the front-stage vane ring 45 and the rear-stage stator vane holding region 433.

According to the configuration of the above (4), as the second steam, for example, external steam (the bypass steam Sby) that is supplied to obtain an output exceeding the rated output in a steam turbine can be supplied to the second cavity 72. In this way, an output exceeding the rated output is obtained in the steam turbine 20 (the high-pressure turbine 4).

(5) In some embodiments, in the configuration of the above (4), the front-stage vane ring 45 may have the protrusion portion 458 that protrudes toward the axial downstream side at the end portion 457 that is located on the radial inner side with respect to the second cavity 72 and faces the rear-stage stator vane holding region 433.

According to the configuration of the above (5), the flow of steam (the bypass steam Sby) flowing from the second cavity 72 through the gap between the front-stage vane ring 45 and the rear-stage stator vane holding region 433 is restricted by the protrusion portion 458, so that the flow rate of the steam (the bypass steam Sby) flowing toward the stator vanes 19 held by the rear-stage stator vane holding region 433 can be prevented from becoming non-uniform in the circumferential direction.

(6) In some embodiments, in the configuration of any one of the above (1) to (5), the central axis C1 of the pipe stand (the first inlet pipe stand 91) for supplying the first steam (the main steam Sin) to the first stator vane 19A that is located on the most upstream side in the axial direction may be located on the axial downstream side with respect to the first stator vane 19A.

According to the configuration of the above (6), for example, in a case where two steam turbines (the high-pressure turbine 4 and the medium-pressure turbine 8) are accommodated in one outer casing 41, as in the steam turbine 20 according to one embodiment, the axial distance between the pipe stand (the third inlet pipe stand 95) for supplying steam to the adjacent steam turbine (the medium-pressure turbine 8) and the first inlet pipe stand 91 for supplying the main steam Sin can be secured. In this way, an axial length of the steam turbine 20 can be suppressed.

(7) In some embodiments, in the configuration of any one of the above (1) to (6), the front-stage vane ring 45 may have the inclined surface 453 that faces the axial upstream side toward the radial inner side.

According to the configuration of the above (7), the inclined surface 453 is provided, so that the axial dimension of the front-stage vane ring 45 can be increased toward the radial inner side. In this way, the above-described stress that is generated in the front-stage vane ring 45 can be reduced.

(8) In some embodiments, in the configuration of the above (7), the inclined surface 453 may linearly extend to face the axial upstream side toward the radial inner side, in the cross section along the radial direction and the axial direction.

According to the configuration of the above (8), compared to a case where the inclined surface 453 is a concave surface, the wall thickness of the front-stage vane ring 45 can be increased by the amount corresponding to the thickness when the inclined surface 453 is not a concave surface. In this way, the above-described stress that is generated in the front-stage vane ring 45 can be reduced.

(9) In some embodiments, in the configuration of the above (7) or (8), the axial wall thickness t of the front-stage vane ring 45 may increase toward the radial inner side between the end surface 454 on the axial downstream side of the front-stage vane ring 45 and the inclined surface 453.

According to the configuration of the above (9), the above-described stress that is generated in the front-stage vane ring 45 can be reduced.

(10) In some embodiments, in the configuration of any one of the above (1) to (9), the number of the stator vanes 19 that are held by the front-stage vane ring 45 may be smaller than the number of the stator vanes 19 that are held by the rear-stage stator vane holding region 433.

According to the configuration of the above (10), by suppressing the number of stages in the front-stage vane ring 45, it is possible to suppress a thrust force acting on the front-stage vane ring 45 due to the difference in steam pressure between the upstream side and the downstream side of the front-stage vane ring 45. In this way, the portions (the first contact portion 438 and the second contact portion 455) which are provided to restrict the movement of the front-stage vane ring 45 toward the axial downstream side can be prevented from becoming large in both the front-stage vane ring 45 and the annular member 43. Therefore, this contributes to downsizing of the steam turbine 20 (the high-pressure turbine 4)

(11) In some embodiments, in the configuration of any one of the above (1) to (10), the steam turbine 20 may be a medium-high pressure integrated type steam turbine 20 which includes a high-pressure section (the high-pressure turbine 4) and a medium-pressure section (the medium-pressure turbine 8). The high-pressure section (the high-pressure turbine 4) may include the annular member 43 and the front-stage vane ring 45.

According to the configuration of the above (11), the medium-high pressure integrated type steam turbine 20 can be downsized. Further, according to the configuration of the above (11), a time required for vane planting work in the medium-high pressure integrated type steam turbine 20 can be shortened.

(12) In some embodiments, in the configuration of any one of the above (1) to (11), the seal region 431 and the front-stage vane ring 45 may form the first cavity 71 to which first steam (the main steam Sin) is supplied, between the seal region 431 and the front-stage vane ring 45. The first steam (main steam Sin) may be supercritical pressure steam.

According to the configuration of the above (12), the supercritical pressure steam turbine can be downsized. Further, according to the configuration of the above (12), a time required for vane planting work in the supercritical pressure steam turbine can be shortened.

REFERENCE SIGNS LIST

4: high-pressure turbine
19: stator vane
19A: first stator vane
20: steam turbine
41: outer casing
43: annular member
45: front-stage vane ring
51: sealing device
71: first cavity
72: second cavity
76: first joining bolt
77: second joining bolt
91: first inlet pipe stand
92: second inlet pipe stand
431: seal region
433: rear-stage stator vane holding region
435: inner casing region
437: recessed portion
453: inclined surface
454: end surface
457: end portion
458: protrusion portion

The invention claimed is:

1. A steam turbine comprising:
an outer casing;
an annular member which is a single member provided on a radial inner side of the outer casing, and which is formed with a seal region in which a sealing device for sealing a gap between the member and an outer peripheral surface of a rotor is disposed, a rear-stage stator vane holding region that holds a rear-stage stator vane, and an inner casing region that connects the seal region and the rear-stage stator vane holding region; and
a front-stage vane ring that is mounted on the annular member and that holds a front-stage stator vane,
wherein the seal region and the front-stage vane ring form a first cavity to which first steam is supplied, between the seal region and the front-stage vane ring.

2. The steam turbine according to claim 1,
wherein the annular member includes an upper half portion and a lower half portion joined together in a horizontal plane,
a plurality of joining bolts that join the upper half portion and the lower half portion are provided, and
the plurality of joining bolts include a first joining bolt disposed within a range in which the seal region is formed along an axial direction, and a second joining bolt that is disposed on a radial outer side with respect to the first joining bolt and whose position in the axial direction overlaps with the first joining bolt.

3. The steam turbine according to claim 1, wherein the front-stage vane ring and the rear-stage stator vane holding region form a second cavity to which second steam is supplied, between the front-stage vane ring and the rear-stage stator vane holding region.

4. The steam turbine according to claim 3, wherein the front-stage vane ring has a protrusion portion that protrudes toward an axial downstream side at an end portion that is located on a radial inner side with respect to the second cavity and faces the rear-stage stator vane holding region.

5. The steam turbine according to claim 1, wherein a central axis of a pipe stand for supplying first steam to a first stator vane that is located on a most upstream side in an axial direction is located on an axial downstream side with respect to the first stator vane.

6. The steam turbine according to claim 1, wherein the front-stage vane ring has an inclined surface that faces an axial upstream side toward the radial inner side.

7. The steam turbine according to claim 6, wherein the inclined surface linearly extends to face the axial upstream side toward the radial inner side, in a cross section along a radial direction and an axial direction.

8. The steam turbine according to claim 6, wherein an axial wall thickness of the front-stage vane ring increases toward the radial inner side between an end surface on an axial downstream side of the front-stage vane ring and the inclined surface.

9. The steam turbine according to claim 1, wherein the number of the stator vanes that are held by the front-stage vane ring is smaller than the number of the stator vanes that are held by the rear-stage stator vane holding region.

10. The steam turbine according to claim 1,
wherein the steam turbine is a medium-high pressure integrated type steam turbine which includes a high-pressure section and a medium-pressure section, and
the high-pressure section includes the annular member and the front-stage vane ring.

11. The steam turbine according to claim 1,
wherein the seal region and the front-stage vane ring form a first cavity to which first steam is supplied, between the seal region and the front-stage vane ring, and
the first steam is supercritical pressure steam.

12. A steam turbine comprising:
an outer casing;
an annular member which is a single member provided on a radial inner side of the outer casing, and which is formed with a seal region in which a sealing device for sealing a gap between the member and an outer peripheral surface of a rotor is disposed, a rear-stage stator vane holding region that holds a rear-stage stator vane, and an inner casing region that connects the seal region and the rear-stage stator vane holding region; and a front-stage vane ring that is mounted on the annular member and that holds a front-stage stator vane, wherein a central axis of a pipe stand for supplying first steam to a first stator vane that is located on a most upstream side in an axial direction is located on an axial downstream side with respect to the first stator vane.

13. A steam turbine comprising:

an outer casing;

an annular member which is a single member provided on a radial inner side of the outer casing, and which is formed with a seal region in which a sealing device for sealing a gap between the member and an outer peripheral surface of a rotor is disposed, a rear-stage stator vane holding region that holds a rear-stage stator vane, and an inner casing region that connects the seal region and the rear-stage stator vane holding region; and a front-stage vane ring that is mounted on the annular member and that holds a front-stage stator vane, wherein the steam turbine is a medium-high pressure integrated type steam turbine which includes a high-pressure section and a medium-pressure section, and the high-pressure section includes the annular member and the front-stage vane ring.

* * * * *